United States Patent

Vollmar

[11] Patent Number: 6,059,144
[45] Date of Patent: May 9, 2000

[54] PROPORTIONING APPARATUS FOR POURABLE BULK MATERIAL

[75] Inventor: Hartmut Vollmar, Hennef-Rott, Germany

[73] Assignee: Mann & Hummel ProTec GmbH, Ludwigsburg, Germany

[21] Appl. No.: 09/252,232

[22] Filed: Feb. 18, 1999

[30] Foreign Application Priority Data

| Feb. 18, 1998 | [DE] | Germany | 198 06 729 |
| Feb. 18, 1998 | [DE] | Germany | 298 02 785 U |

[51] Int. Cl.⁷ .................................. G01G 13/00
[52] U.S. Cl. .................. 222/77; 222/135; 222/145.6; 222/413; 222/559
[58] Field of Search .................. 222/63, 77, 135, 222/145.5, 145.6, 413, 485, 559, 561

[56] References Cited

U.S. PATENT DOCUMENTS

| 3,866,806 | 2/1975 | Shapland, Jr. | 222/561 |
| 4,257,543 | 3/1981 | Muschner et al. | 222/561 |
| 4,528,848 | 7/1985 | Hafner | 222/77 |
| 4,759,479 | 7/1988 | Tinnes | 222/559 |
| 5,148,943 | 9/1992 | Moller | 222/77 |
| 5,450,984 | 9/1995 | Rohr | 222/77 |
| 5,857,589 | 1/1999 | Cline et al. | 222/135 |

*Primary Examiner*—Joseph A. Kaufman
*Attorney, Agent, or Firm*—Evenson, McKeown, Edwards & Lenahan, P.L.L.C.

[57] ABSTRACT

A proportioning apparatus including at least one reservoir tank (1) having an outlet port (11) for pourable bulk material and a weighing tank (3) for receiving bulk material discharged from the at least one reservoir tank, the weighing tank being arranged under the at least one reservoir tank and including a weighing cell for weighing bulk material, in which it is possible to open or close the outlet port of the at least one reservoir tank by using a shut-off device (2), and in which each shut-off device associated with a reservoir tank has a tubular housing (21) with a longitudinal axis LA, as well as a passage opening (20) for bulk material extending transversely across the longitudinal axis of the housing and with two breakthroughs (20a, 20b) extending through lateral surfaces of the housing, the outlet port of the at least one reservoir tank communicating with the passage opening, and in which a closure element (22) having a cross-section corresponding to that of the tubular housing, can be shifted inside the tubular housing along the longitudinal axis, and in which the closure element will open or close the passage opening for the bulk material, depending on the respective shift position of the closure element within the tubular housing.

12 Claims, 4 Drawing Sheets

PROPORTIONING APPARATUS FOR POURABLE BULK MATERIAL

BACKGROUND OF THE INVENTION

This invention relates to a proportioning apparatus comprising at least one reservoir tank including an outlet port for pourable bulk material and a weighing tank for receiving discharged bulk material, with the receiving tank being arranged under the at least single reservoir tank and including a weighing cell for weighing bulk material, wherein the outlet port of the at least single reservoir tank can be opened or closed by means of a shut-off device.

Proportioning apparatus of this kind are already known and utilized, for example, for proportioning in batch quantities a charging material, composed of either one sort or a plurality of bulk material constituents, to a processing system, for instance, in order to feed extruders with granular plastic material and possibly further admixtures. A distinction is made between volumetric and gravimetric proportioning apparatus, depending on the respective proportioning method to be carried out.

The characteristic of known gravimetric proportioning apparatus is that bulk materials to be proportioned are provided in corresponding reservoir tanks and supplied in batch quantities into a weighing tank arranged under the reservoir tank, according to the proportional weight desired. For this purpose, it is common practice to arrange a shut-off device in the shape of a stop slide valve near the outlet port of each reservoir tank. When the stop slide valve is opened, the bulk material available in the respective reservoir tank will fall into the weighing tank, and then the stop slide valve will be closed again by means of a corresponding control mechanism after having supplied the desired proportional weight into the weighing tank.

Due to the trend of continuously increasing the performance of processing systems for which traditional proportioning apparatus are used and, at the same time, to the progressively increasing requirements for accuracy of production, great demands are made on the precise operation of proportioning apparatus and on the outcome obtained therefrom. Therefore, the shut-off devices arranged between reservoir tanks and the weighing tank play an important key role for accurately weighing the bulk material located in the weighing tank. On the one hand, they need to open and close the outlet ports of the reservoir tanks as quickly as possible and, on the other hand, they need to ensure that the outlet port is entirely sealed, if possible, when in the closed position. Since the shut-off devices are operated at both a high frequency and speed over long periods of time whenever the downstream processing system is activated, high mechanical requirements are established regarding abrasion, stability and the like, higher requirements than those heretofore applied to shut-off devices of proportioning apparatus.

The stop slide valves traditionally used as shut-off devices in the prior art comprise a sliding plate within a rail-like guiding device, which opens or closes the outlet port of the reservoir tank depending on the respective shift position. These conventional stop slide valves having longitudinally shiftable plates turn out to be deficient and susceptible to failures on very high efficiency proportioning apparatus, because they can easily cant within their rail-like guiding device when being actuated very quickly. Furthermore, it cannot always be assured that the outlet port of the reservoir tank is sealed in its entirety. In addition, the structural design of a conventionally constructed proportioning apparatus including reservoir tanks and a weighing tank as well as stop slide valves arranged therebetween, proves to be very complicated; and it may become necessary to retrofit the proportioning apparatus as a result of changes in production requirements or the like, which also turns out to be very difficult.

SUMMARY OF THE INVENTION

It is therefore an object of this invention to provide an improved proportioning apparatus of the kind described above such that, even in case of very high performance, the proportioning of pourable bulk materials for processing systems can be carried out in an accurate and permanently reliable manner with regard to the operation.

Another object of the invention is to provide a proportioning apparatus which has a considerably simplified structural design and which easily can be adapted to changing production requirements.

These an other objects are achieved in accordance with the present invention by providing a proportioning apparatus comprising at least one reservoir tank having an outlet port for pourable bulk material, and a weighing tank for receiving bulk material discharged from the at least one reservoir tank, the weighing tank being arranged under the at least one reservoir tank and including a weighing cell for weighing bulk material, a shut-off device associated with each reservoir tank for opening and closing the outlet port of the respective reservoir tank, each shut-off device comprising a tubular housing and a closure element received in the tubular housing, each tubular housing having a passage opening for the bulk material extending transversely of a longitudinal axis of the tubular housing, each passage opening having two breakthroughs extending through upper and lower surfaces of the tubular housing, the outlet port of each reservoir tank communicating with the passage opening of the associated shut-off device, and each closure element having a cross section corresponding to that of the tubular housing in which it is received and being shiftable along the longitudinal axis of the tubular housing between open and closed positions within the housing, the closure element opening or closing the passage opening depending on the position into which it is shifted.

In accordance with the invention, the objects are achieved in that each shut-off device associated with a reservoir tank is configured to have a tubular housing and a passage opening for the bulk material extending transversely of the longitudinal axis of the housing and with two breakthroughs extending through the top and bottom areas thereof. In addition, it is proposed that the outlet port of the reservoir tank be in communication with the passage opening, and that a closure element having a cross section corresponding to the cross section of the tubular housing can be guided inside the tubular housing by shifting along the longitudinal axis, and, furthermore, that the closure element opens or closes the passage opening for the bulk material depending on the respective shift position within the tubular housing.

Within the scope of the invention, it was observed that—compared with conventional proportioning apparatus—a considerable improvement of the performance or throughput and of the proportioning accuracy can be achieved by constructing the shut-off device as proposed, i.e. having a tubular housing as well as a closure element designed equivalent thereto and guided therein by longitudinal shifting. The closure element can be guided within the shut-off device housing in a substantially more accurate way, as a result of the closure element being guided within a tubular housing by shifting in longitudinal direction, so that there is no possibility that the closure element will cant, for example, in case of very high-speed operations and corresponding acceleration. At the same time, the mechanical abrasion of the closure element will be remarkably reduced because it is accurately guided within the tubular housing, thus leading to increased durability and a longer service life for the proportioning apparatus according to the invention.

In accordance with one advantageous illustrative embodiment of the invention, the closure element is constructed in the shape of a piston and guided inside the tubular housing of the shut-off device both in a sealing and longitudinally shifting manner free from backlash. In this case, the closure element is guided by longitudinally shifting within the tubular housing over the entire area and along the periphery of the same, so that a sealing effect can be achieved for the entire passage opening and, thus, also for the outlet port of the reservoir tank which is a component part of the proportioning apparatus according to the invention, even if it is intended to proportion bulk materials of very fine particles. In this way, it is feasible to substantially increase the accuracy of proportioning by the proportioning apparatus constructed according to the invention.

In one preferred illustrative embodiment of the invention, the shut-off devices are arranged in a common plane and joined to form a shut-off unit located between the reservoir tanks and the weighing cell. By joining the shut-off devices associated with the reservoir tanks in a shut-off unit and in flat formation between the reservoir tanks and the weighing tank, the proportioning apparatus according to the invention is provided with an extraordinarily compact and simplified structural design. In particular, it is possible to add or remove reservoir tanks to/from the proportioning apparatus according to the invention with only a few manual operations, in order to adjust the proportioning apparatus to changing production conditions and to expand or shrink the proportioning apparatus to handle more or fewer bulk material constituents. This embodiment is described in more detail hereinafter.

In accordance with a further advantageous illustrative embodiment of the invention, the shut-off unit is constructed as a support part traversing the direction of the bulk material constituents falling out of the reservoir tanks, with the support part including passage openings for bulk material constituents falling vertically out of the reservoir tanks into the weighing tank, wherein the passage openings of the support part communicate with the cylindrical hollow spaces extending transversely thereto and form the tubular housings of the shut-off devices in which the piston-shaped, shiftable closure elements are arranged .

In accordance with another advantageous illustrative embodiment of the invention, the shut-off unit has a frame-like, especially ring-shaped, support part, and the shut-off devices inside the support part are arranged in star configuration with their longitudinal axes extending along the diameter of the support part.

In accordance with a further embodiment of the invention, the support part is constructed in one piece with the tubular housings of the shutoff devices, for example, by manufacturing the same as a monobloc cast part, and an inlet port is provided for each closure element in the region of the outside diameter of the support part, with the inlet port extending through the lateral area of the support part and opening into the tubular housings. As a result of this embodiment, it is possible to design the proportioning apparatus according to the invention as modular system which allows the proportioning apparatus to be easily and quickly adjusted to changing production requirements and to a varying number of bulk material constituents to be proportioned, as well as to the respective proportional weight thereof.

For this purpose, the closure elements including a drive mechanism associated therewith can be inserted into the housings arranged in the support part in order to form the shut-off devices, so that the support part can quickly be equipped with shut-off devices corresponding to the respective number of reservoir tanks required by inserting and/or removing the closure elements including a drive mechanism associated therewith into or from the tubular housings arranged in the support part. If one or more tubular housings of the shut-off devices formed in the support part are not being used, it is possible to close them by attaching blind plugs or the like.

Another advantageous illustrative embodiment of the invention provides a clearance inside the support part of the shut-off unit in the region between each pair of neighboring shut-off devices and, furthermore, the support part is provided with an inlet port extending through the surface area of the support and opening into the clearance, it being possible to insert a screw-type metering device into the inlet port and to connect it to the support part. In this manner, it is not only possible to equip the proportioning apparatus according to the invention with reservoir tanks and the associated shut-off devices in order to proportion bulk material constituents, it is likewise possible to make use of those screw-type metering devices, which themselves are well-known, in addition to the reservoir tanks and shut-off devices associated therewith, for example, in order to proportion bulk material constituents of very light weight and supply them to the weighing tank. For this purpose, at least the front screw tip of the screw-type metering devices is pushed through the inlet port of the support part into the same, so that the front screw tip, through which the respective bulk material constituent to be proportioned is discharged, extends into the clearance of the support part and the proportional bulk material constituent can fall into the weighing tank arranged under the support part.

In this case, it is likewise possible to configure the proportioning apparatus in accordance with the invention as a modular system as already described previously for the very reason that, if need be, the screw-type metering devices can be fastened to or removed from the support part, namely to/from the passage openings embodied there and opening into the clearances between two adjoining shut-off devices. The passage openings which are provided for the screw-type metering devices and not in use can also be closed by means of blind plugs or the like.

According to one advantageous illustrative embodiment of the invention, it is thus possible to provide up to six shut-off devices for the associated reservoir tanks and up to six screw-type metering devices for the proportioning apparatus as described in this invention. In this way it becomes possible to use the proportioning apparatus of the invention to produce blends of granular plastic material for nearly each and every production demand, it being intended to feed the same to extrusion or injection-molding systems.

It is additionally possible to produce a further increase in the proportioning accuracy with the proportioning apparatus according to the invention, namely by providing a mixer equipped with a rotatable screw for mixing the bulk material coming out of the weighing tank, wherein the mixer is arranged near the outlet of the proportioning apparatus towards the processing system and is inclined at an angle ranging from 10° up to 60° with reference to a horizontal line. The inclined position of the mixer assures that the bulk material thoroughly mixed within the mixer is always completely discharged into the processing system downstream of the proportioning apparatus, whenever the mixer is activated.

BRIEF DESCRIPTION OF THE DRAWINGS

An illustrative embodiment of the invention is shown in the drawings and described hereinafter in more detail. In the drawings.

DETAILED DESCRIPTION OF PREFERRED EMBODIMENTS

Figure 1:
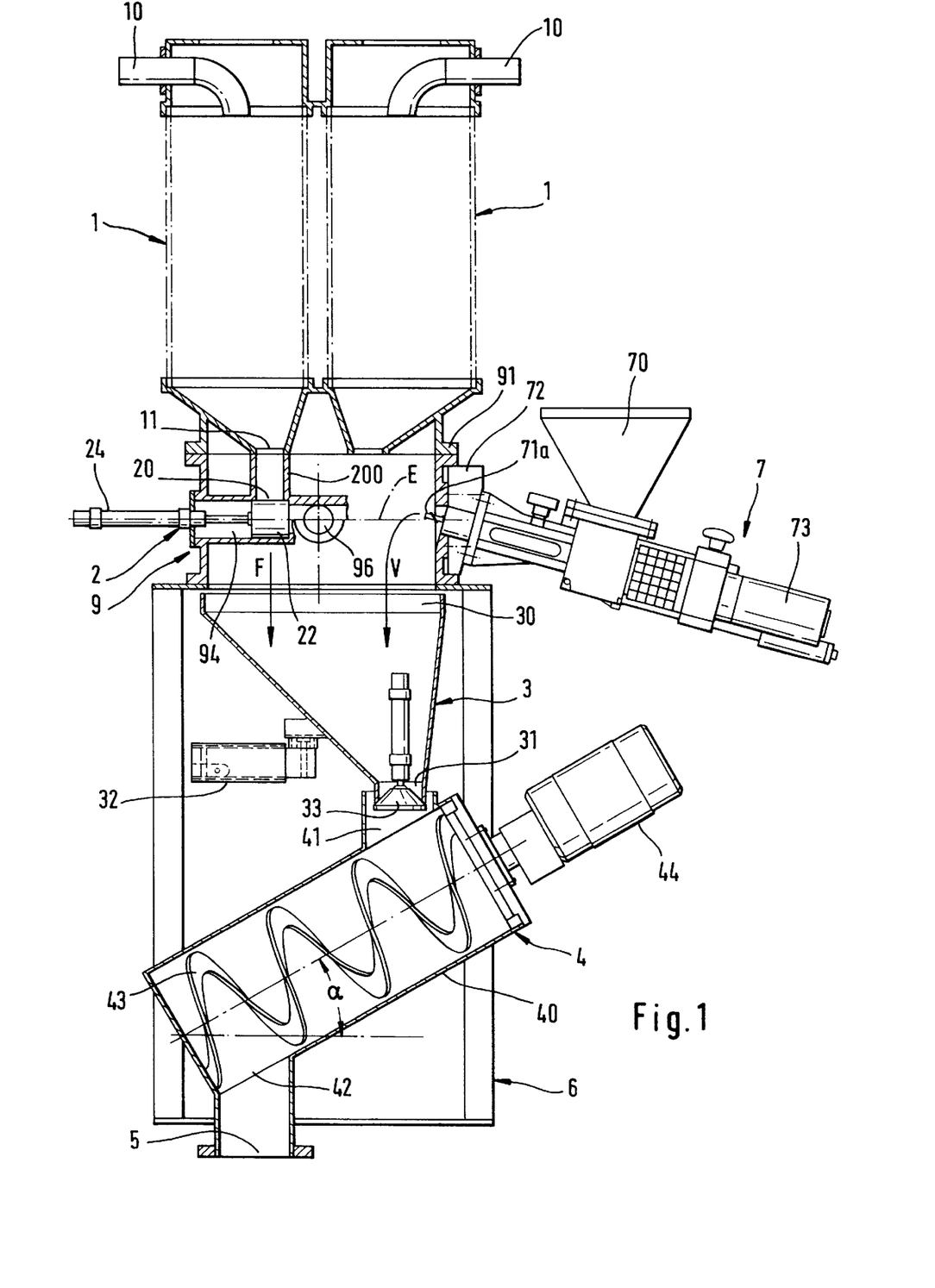
FIG. 1 shows a side view of a proportioning apparatus according to the invention.

FIG. 1 shows a proportioning apparatus suitable for gravimetrically proportioning pourable bulk material consisting of a plurality of bulk material constituents and feeding the same to a processing system, such as an extrusion or injection-moulding system for manufacturing plastic products, which is not illustrated herein.

For those bulk material constituents having a larger proportional weight of the bulk material to be proportioned, the proportioning apparatus comprises several funnel-shaped reservoir tanks 1 including feed pipe fittings 10, and for those bulk material constituents having a lower proportional weight of the bulk material to be proportioned, the proportioning apparatus comprises screw-type metering devices 7 including charging hoppers 70. For each bulk material constituent, one individual reservoir tank 1 or screw-type metering device 7 is provided. The bulk material constituents are distributed to the reservoir tanks 1 or screw-type metering devices 7 according to the respective proportional weight of each bulk material constituent in the bulk material to be proportioned. Because the screw-type metering devices 7 facilitate a considerably more precise proportioning than the reservoir tanks 1, the screw-type metering devices 7 are provided for those constituents which are of a very low proportional weight.

The individual bulk material constituents of the bulk material to be proportioned enter the funnel-shaped weighing tank 3 via a shut-off unit 9 described in more detail hereinafter. The weighing tank is mounted to a weighing cell 32 within a cradle 6 in a well-known manner, and the weighing tank weighs the individual bulk material constituents of the bulk material to be proportioned by means of the weighing cell 32.

The outlet port 31 of the weighing tank 3, which can be opened or closed as needed by a closure element 33, extends into a mixer 4 which thoroughly mixes the weighed and proportioned bulk material by means of a screw 43 rotatable by a drive mechanism 44. After mixing, the bulk material is discharged out of the proportioning apparatus via outlet port 5 towards the downstream processing system, not shown herein.

The gravimetric proportioning method measures the individual bulk material constituents by weighing the individual bulk material constituents in batch quantities within the weighing tank 3 aided by weighing cell 32. When all bulk material constituents are proportioned in batch quantities in the weighing tank 3 according to their respective shared weight, the closure element 33 opens the outlet port 31 of the weighing tank 3, so that the contents of the weighing tank will be discharged into the mixer 4. After subsequent closure of the closure element 33, another charge can be proportioned within the weighing tank 3. Meanwhile, the charge which was proportioned previously is fed to the processing system via outlet port 5, after mixer 4 has mixed the charge thoroughly.

To proportion the bulk material constituents available in the funnel-shaped reservoir tanks 1, the outlet ports 11 arranged in the bottom region of the reservoir tanks and extending towards the weighing tank 3 can be opened and/or closed by means of shut-off devices 2, so that the individual bulk material constituents will enter the weighing tank 3 after having passed through the shut-off device 2 by successively opening and closing the shut-off devices 2 associated with the respective reservoir tanks 1, as indicated by arrow F. Furthermore, the individual bulk material constituents can be proportioned in the weighing tank 3 until they have reached the respective shared weight desired. In this instance, the shut-off devices 2 are arranged within shut-off unit 9 and aligned in plane E, which plane extends transversely of the direction of movement F of the bulk material constituents falling out of the reservoir tanks 1 into the weighing tank 3. The detailed structure thereof is visible in FIG. 2.

Figure 2:
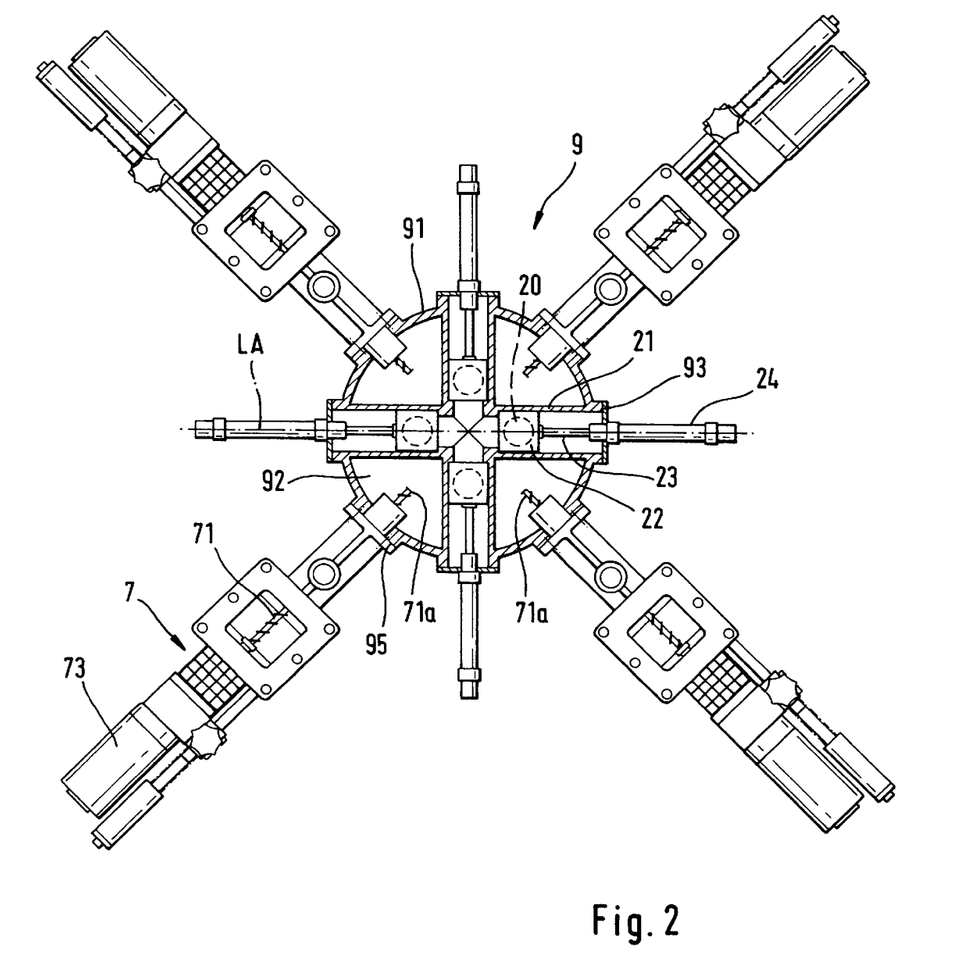
FIG. 2 shows a section along plane E of FIG. 1 extending through the shut-off device of the proportioning apparatus according to the invention.

As can be seen in FIG. 2, the shut-off unit 9 is equipped with a frame-like, ring-shaped support part 91. The shut-off devices 2 are arranged within the support part 91 in a star configuration with the longitudinal axis LA thereof extending along a diameter D of the support part 91. According to the present exemplified embodiment, four stop slide valves 2 are arranged along the diameter of the shut-off unit 9 and in a star-shaped alignment offset from one another at respective angles of 90°. Accordingly, it is possible to open or close four reservoir tanks 1 provided for bulk material constituents by means of the shut-off unit 9.

Figures 3, 4:
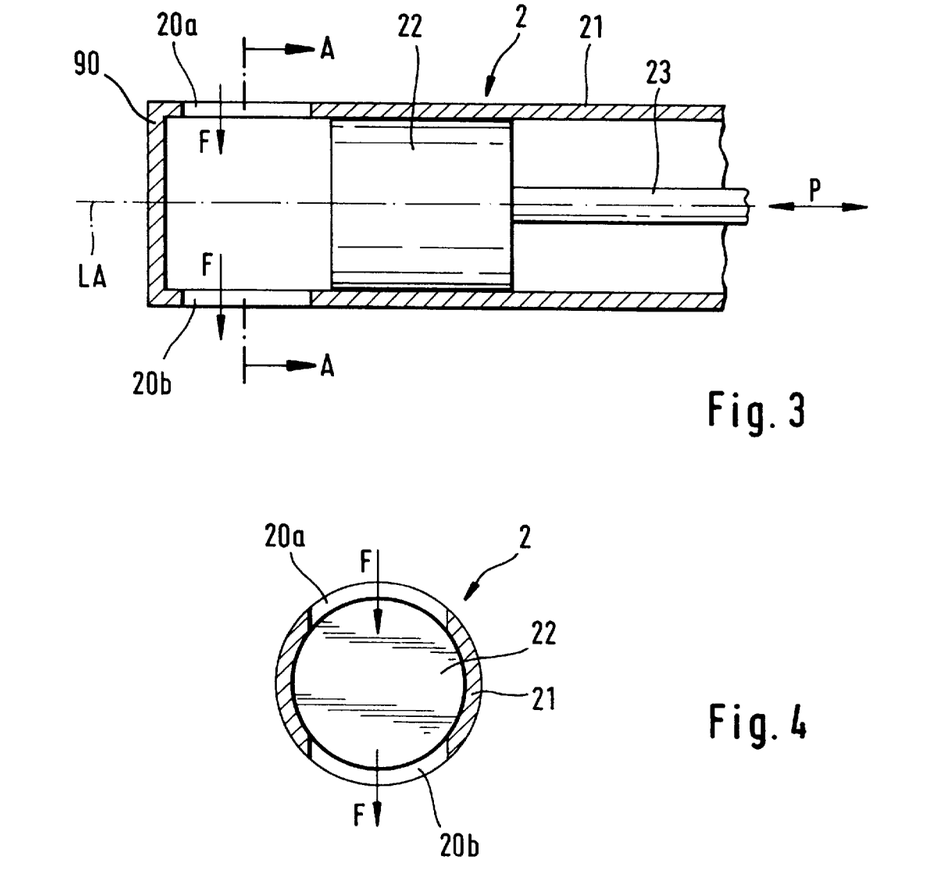
FIG. 3 shows a schematic illustration of a section through the shut-off device of the proportioning apparatus according to the invention.
FIG. 4 shows a section through the shut-off device as indicated by arrows A—A in FIG. 3.
Figure 5:
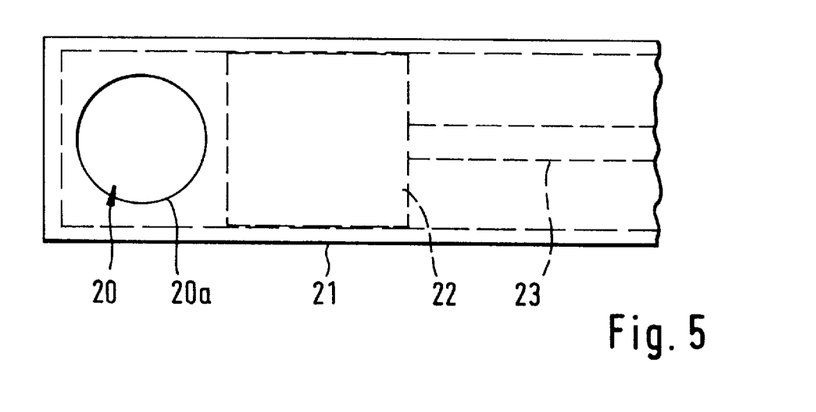
FIG. 5 is a top view of the shut-off device according to FIG. 3.

Each shut-off device 2 is constructed as illustrated in more detail in FIGS. 3 to 5. The shut-off device 2 comprises a tubular housing 21 having a circular cross section, with a closure element 22 being guided therein in a shiftable way along longitudinal axis LA in the direction indicated by arrow P. Each closure element 22 is actuated by a driving rod 23 as well as a pneumatic cylinder 24 which is mounted outside the shut-off device.

In addition, the tubular housing 21 has a passage opening 20 extending in transverse direction towards the longitudinal axis LA of the housing. Passage opening 20 is formed by two breakthroughs 20a, 20b, both of which are in alignment and extend through the top and bottom areas of the tubular housing 21. The passage opening 20 serves to discharge the respective bulk material constituent out of the reservoir tank 1 into the weighing tank 3, as indicated by arrows F. As a consequence, the reservoir tank 1 to be closed by stop slide valve 2 is fastened to the shut-off unit 9 in such a way that the outlet port 11 thereof is aligned with the passage opening 20 of the shut-off device 2. For this purpose, it is advantageous to connect the passage opening 20 to the outlet port 11 of the reservoir tank 1 by means of a pipe fitting 200, as can be seen in FIG. 1.

In accordance with one preferred embodiment, the closure element 22 has a piston-like shape, with the cross section of the closure element corresponding to the cross section of the tubular housing 21, so that the closure element is actuated within the housing in a sealing manner free from backlash. Due to the circular cross sections of both the tubular housing 21 and the closure element 22, which correspond to each other, the closure element 22 is guided free from backlash and along its entire circumference within the tubular housing 21 and, thus, over the entire area. The rear extremity of the housing is preferably equipped with a stepped stop 9 which is provided for the closure element 22.

To open the outlet port 11 of the reservoir tank 1 in order to charge the weighing tank 3 with the respective bulk material constituent available inside the reservoir tank 1, a pneumatic cylinder 24 pushes the closure element 22 to the right-hand side in the direction indicated by arrow P, as shown in FIG. 3, so that the closure element will reach the position shown in FIG. 3, meaning that the passage opening 20 will be released in its entirety. To close the passage opening 20 and, thus, to close the outlet port 11 of the reservoir tank 1 arranged inside the proportioning apparatus, the closure element 22 as it is illustrated in FIG. 3 is shifted to the left-hand side by means of the pneumatic cylinder 24, until it will rest against the stop 90 of the tubular housing 21. In this position, which is not shown in the Figure, the closure element 22 closes the passage opening 20 in its entirety. This sealing actuation of the closure element 22 inside the housing 21 will also prevent very fine particles from penetrating towards the weighing tank 3. Thus, it is possible to achieve a high degree of proportioning accuracy by means of the proportioning apparatus of the invention.

In addition to the extraordinarily secure sealing method described above, and thus the high degree of proportioning accuracy of the proportioning apparatus, the embodiment of the shut-off device having a tubular housing 21 as well as a correspondingly shaped cylindrical closure element 22 also enables a particularly precise actuation of the closure element 22 within the tubular housing 21 to be achieved. Consequently, even in case of a high operational frequency and acceleration of the closure element 22, the closure element will not cant within the tubular housing 21, and the performance of the proportioning apparatus will be increased, and the abrasive wear thereof will be reduced.

For that reason, the shut-off device 2 having a tubular housing 21 and a correspondingly shaped cylindrical closure element 22 facilitates a substantially more accurate and powerful proportioning of bulk materials and their constituents as well as a longer durability than has been the case so far with traditional shut-off devices, such as stop slide valves.

A further substantial advantage of the shut-off devices 2 having a tubular housing 21 and a correspondingly shaped cylindrical closure element 22, is the extremely small space they require, so that it is possible to realize the abovementioned, highly compact positioning of stop slide valves within a ring-shaped support part 91 and in a plane E, all joined to a shut-off unit 9 as shown in FIG. 2.

Figure 6:
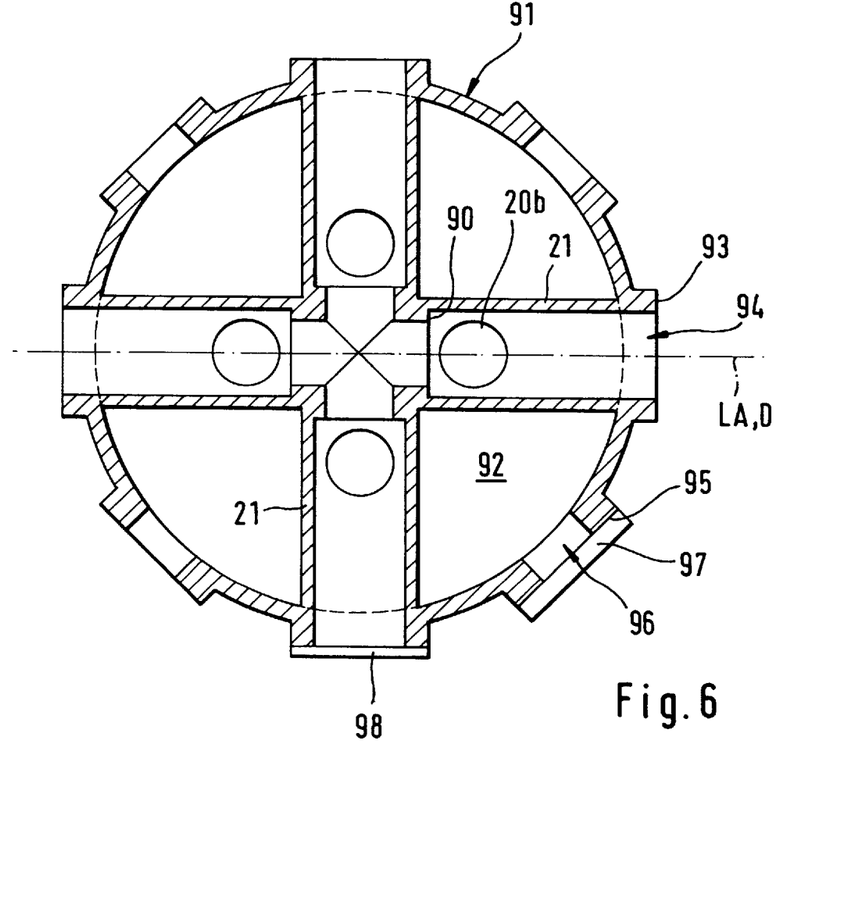
FIG. 6 shows a section through the support part of a shut-off unit along plane E shown in FIG. 1.

FIG. 6 shows the configuration of the ring-shaped support part 91 of the shutoff unit 9 in more detail. As can be seen in FIG. 6, the support part 91 is constructed in one piece, for example, as a monobloc cast part, with four tubular housings 21 for the shut-off devices 2 extending in a star configuration along the diameter of the support part 91. The breakthroughs 20a and 20b which form the passage opening 20 for the bulk material are constructed in each tubular housing 21. Each tubular housing 21 extends through the lateral area of the ring-shaped support part 91, and each housing 21 is provided with an inlet port 94 through which a closure element 22 including driving rod 23 and pneumatic cylinder 24 fastened thereto can be inserted from the outside into the tubular housing 21, in order to form a shut-off device 2 corresponding to the illustration of FIG. 2. For this purpose, a flange facing 93 is provided in that region of the support part 91 surrounding the inlet port 94, and the flange facing is equipped with adequate fixing means, not illustrated in FIG. 6, in order to fasten the pneumatic cylinder 24. A stepped stop 90 is provided at the inner extremity of the tubular housing 21 lying opposite the inlet port 94, which serves as a limit stop for the closure element 22 moved into the closed position, when the closure element closes the passage opening 20 inside the tubular housing 21.

If it is intended to use a support part such as support part 91, then it is possible to construct the shut-off unit 9 as a modular system according to the respective requirements of production. If required, the support part 91 is then equipped with shut-off devices 2 by inserting closure elements together with their drive mechanisms, i.e. driving rod 23 and pneumatic cylinder 24, into the tubular housing 21 which is constructed as an integral part within the support part 91. It is therefore possible to adjust the shut-off unit 9 of the proportioning apparatus quickly to changing production conditions which require more or fewer bulk material constituents and the respective number of reservoir tanks 1 and shut-off devices 2 associated therewith. When a tubular housing 21 of a shut-off device 2 arranged within the support part 91 is not being utilized, the inlet port 94 of the tubular housing 21 can temporarily be closed by means of a blind plug 98.

Since the shut-off devices 2 developed to have tubular housings 21 are arranged within the support part 91 in star configuration and offset relative to each other at an angle of 90°, and since the shut-off devices 2 do not require a lot of space, a clearance 92 remains between two adjacent tubular housings 21, which can be utilized for proportioning further bulk material constituents into the weighing tank 3 by means of the aforementioned screw-type metering devices 7.

For this purpose, each clearance 92, being more or less in the shape of a quarter circle, is accessible from the outside of the support part 91 via an inlet port 96 located in the lateral surface of the support part, so that the front end region of a screw-type metering device 7, through which the bulk material constituent to be proportioned is discharged, can be arranged in such a way that it opens into the clearance 92 of the support part 91. For this purpose, a flange facing 95 including fixing means is likewise provided in the region of the support part 91 surrounding the inlet port 96, so that it is possible to fasten a screw-type metering device 7 to the flange facing; see also FIGS. 1 and 2 on this.

As can be seen from FIGS. 1 and 2, the screw-type metering device 7 is fastened to the support part 91 of the shut-off unit 9 by means of an angle bracket 72 and is arranged to have an upward inclination in the feed direction. The forward end region 71a of a metering screw 71, which is provided inside the screw-type metering device 7 and is rotatable by means of a drive mechanism 73, projects into the clearance 92 within support part 91. When the metering screw 71 is rotating, the bulk material constituent to be proportioned by the screw-type metering device 7 will reach the front end 71a of screw 71 via the charging hopper 70, and thereafter it will fall through clearance 92 located in support part 91 into the weighing tank 3 arranged under the shut-off unit 9, where the bulk material constituent is weighed by means of the weighing cell 32. Arrow V of FIG. 1 indicates the path described.

In this instance, too, the proportioning apparatus can be constructed as a modular system, because, if need be, the screw-type metering devices 7 can be fastened to the inlet ports 96 of support part 91 extending to the clearances 92 or they can be removed from the inlet ports when not being used. In that instance, an unused inlet port 96 located in support part 91 can be closed temporarily by means of a suitable blind plug 97.

Through arranging shut-off devices 2 along the diameters of support part 91 of shut-off unit 9 and through arranging screw-type metering devices 7 between two adjacent shut-off devices 2, a very compact proportioning apparatus is created, in which all shut-off devices 2 for the reservoir tanks 1 and all screw-type metering devices 7 are arranged in plane E within the proportioning apparatus.

In particular, as a result of this construction, it is also very easy to adjust the proportioning apparatus to changing production conditions requiring more or fewer bulk material constituents. As illustrated in FIGS. 2 to 6, the construction of the shut-off unit 9 including a support part 91 allows the shut-off unit 9 to be constructed as a modular system and, thus, the proportioning apparatus to be equipped with a desired number of reservoir tanks 1 and/or screw-type metering devices 7.

According to the illustrated preferred embodiment, the proportioning apparatus can be equipped with up to four reservoir tanks 1 and the corresponding shut-off devices 2 in support part 91 and, additionally, up to four screw-type metering devices 7 can be fastened to the support part 91 of the shut-off unit 9, so that a total of up to eight bulk material constituents can be measured gravimetrically within the weighing tank 3 and then be fed to the processing system. If fewer bulk material constituents are required, then the respective number of screw-type metering devices 7 and/or reservoir tanks 1 are detached from the proportioning apparatus and the shut-off devices 2 associated with the detached reservoir tanks 1 are removed from the support part 91.

Figure 7:
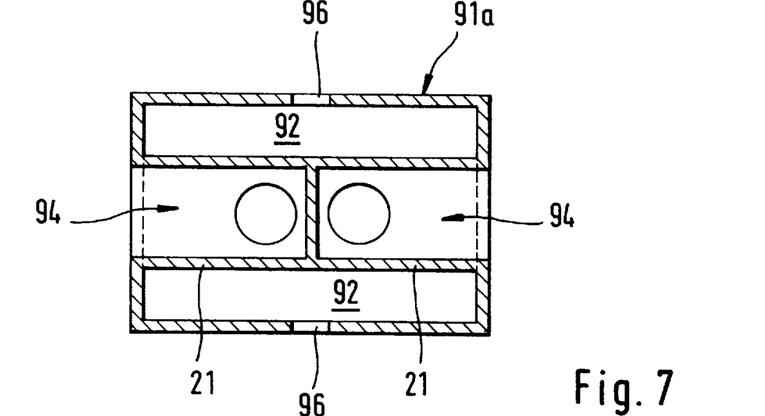
FIG. 7 shows another illustrative embodiment of a support part.

Of course, the invention is not limited to the preferred construction of the support part as a ring-shaped support part 91 as shown in FIGS. 1, 2 and 6, to which four shut-off devices 2 for four reservoir tanks 1 as well as four screw-type metering devices 7 can be connected. It is likewise possible, however, to construct the support part in a deviating way which allows more or fewer shut-off devices 2 and/or screw-type metering devices 7 to be attached. FIG. 7 shows a frame-like support part 91a which has a substantially rectangular cross section with two in-line tubular housings 21 including inlet ports 94 to receive the shut-off devices 2. A total of two clearances 92 are provided adjacent thereto, so that it is possible, if need be, to attach screw-type metering devices 7 to the support part 91a via the inlet ports 96 as described previously.

In accordance with another preferred embodiment, the shut-off device 2 as illustrated in FIG. 3 up to 5 can also be provided, when required, for opening or closing merely one single reservoir tank 1 within the proportioning apparatus containing only one sort of bulk material constituents.

In order to be capable of carrying on this extraordinarily accurate and powerful method of proportioning bulk materials via the outlet port 5 toward the processing system likewise to such a high degree of accuracy, which can be realized by arranging shut-off devices 2 having tubular housings 21 and cylindrical stop slide valves 22, the mixer 4 mentioned above is additionally arranged near the outlet of the proportioning apparatus and inclined at an angle θ of 30° with reference to a horizontal line. In the embodiment illustrated in FIG. 1, the mixer is inclined at a descending angle from inlet port 41 to outlet port 42.

Within the scope of this invention, it was observed that when the mixer 4 was provided with this inclined position with reference to a horizontal line, the proportioned bulk material was mixed in a much more thorough way and, furthermore, the mixer was always discharged in its entirety. The reason for this is that there is no more dead space within the housing 40 of the mixer, where material could be trapped.

Thus, the proportioning apparatus of the invention as described above enables a particularly accurate and powerful proportioning method for pourable bulk material constituents while the abrasion remains at a very low level. Of course, the proportioning apparatus of the invention is not restricted to the exemplified embodiment illustrated in the drawing. It is possible within the scope of the invention to modify the different dimensions and equipment of the apparatus to adapt it to the respective production requirements. In particular, it is possible to construct the proportioning apparatus for a varying number of bulk material constituents to be proportioned. For this purpose, any number can be provided ranging from one single constituent up to, for example, an embodiment with six shut-off devices 2 suitable for six corresponding reservoir tanks 1 and arranged along the diameter of the shut-off unit 9 and/or the support part 91 thereof and, correspondingly, six screw-type metering devices 7 to be fastened between two adjacent shut-off devices. Thus, with such an illustrative embodiment it would be possible to proportion up to twelve different bulk material constituents.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A proportioning apparatus comprising at least one reservoir tank having an outlet port for pourable bulk material, and a weighing tank for receiving bulk material discharged from said at least one reservoir tank, said weighing tank being arranged under the at least one reservoir tank and including a weighing cell for weighing bulk material, a shut-off device associated with each reservoir tank for opening and closing the outlet port of the respective reservoir tank, each shut-off device comprising a tubular housing and a closure element received in the tubular housing, each tubular housing having a passage opening for the bulk material extending transversely of a longitudinal axis of the tubular housing, each passage opening having two breakthroughs extending through upper and lower surfaces of the tubular housing, the outlet port of each reservoir tank communicating with the passage opening of the associated shut-off device, and each closure element having a cross section corresponding to that of the tubular housing in which it is received and being shiftable along the longitudinal axis of the tubular housing between open and closed positions within the housing, said closure element opening or closing said passage opening depending on the position into which it is shifted.

2. A proportioning apparatus according to claim 1, wherein the closure element has the shape of a piston sealingly received within a tubular housing of the shut-off device, and said shut-off device is actuated by shifting said piston-shaped closure element within the tubular housing of the shut-off device.

3. A proportioning apparatus according to claim 1, wherein a plurality of shut-off devices are arranged in a common plane and joined to a shut-off unit which is located between the reservoir tanks and the weighing tank.

4. A proportioning apparatus according to claim 3, wherein said plurality of shut-off devices are mounted on a support part extending transversely across a path traversed by bulk material falling from said at least one reservoir tank into said weighing tank, said support part including said passage openings for bulk material, said passage openings communicating with cylindrical hollow spaces which extend transversely thereto and which form the tubular housings of the shut-off devices, and said shiftable closure elements received in said tubular housings being piston-shaped.

5. A proportioning apparatus according to claim 3, wherein the shut-off unit comprises a frame-like support part, and the shut-off devices within the support part are arranged in a star configuration with each shut-off device having a longitudinal axis extending along a diameter of the support part.

6. A proportioning apparatus according to claim 5, wherein said frame-like support part is ring-shaped.

7. A proportioning apparatus according to claim 5, wherein the support part and the tubular housings of the shut-off devices are constructed as a single unitary piece, and an inlet port for the closure element of each shut-off device is provided extending through a lateral surface of the support part and opening into a respective tubular housing.

8. A proportioning apparatus according to claim 5, wherein a clearance is provided within the support part of the shut-off unit between each two adjacent shut-off devices, and an inlet port for receiving a screw-type metering device is provided extending through a lateral surface of the support part and opening into each said clearance, each said screw-type metering device being connectable to said support part.

9. A proportioning apparatus according to claim 5, wherein the shut-off unit is constructed as a modular system and in such a way that said closure elements and drive mechanisms associated therewith can be inserted into the housings arranged within the support part in order to construct the shut-off devices.

10. A proportioning apparatus according to claim 9, wherein the support part can be equipped with at least one screw-type metering device arranged between two adjacent shut-off devices.

11. A proportioning apparatus according to claim 1, wherein up to six shut-off devices can be provided for a corresponding number of reservoir tanks and up to six screw-type metering devices can be provided between adjacent shut-off devices.

12. A proportioning apparatus according to claim 1, wherein a mixer equipped with a rotatable screw is provided near an outlet port of the weighing tank for thoroughly mixing bulk material discharged from the weighing tank, said mixer being inclined at an angle in the range from 10° to 60° with reference to a horizontal line.

* * * * *